(12) United States Patent
Plaetzer et al.

(10) Patent No.: US 7,156,920 B2
(45) Date of Patent: Jan. 2, 2007

(54) COATING DEVICE

(75) Inventors: Daniel Plaetzer, Krefeld (DE);
Wilfried Plaetzer, Krefeld (DE);
Ernst-Werner Schmidt, Langenfeld (DE); Roman Lieutenant, Willich (DE)

(73) Assignee: Band-Zink GmbH, Langenfeld (DE)

( * ) Notice: Subject to any disclaimer, the term of this patent is extended or adjusted under 35 U.S.C. 154(b) by 28 days.

(21) Appl. No.: 10/482,635

(22) PCT Filed: Jun. 14, 2002

(86) PCT No.: PCT/EP02/06540

§ 371 (c)(1),
(2), (4) Date: Dec. 24, 2003

(87) PCT Pub. No.: WO03/002778

PCT Pub. Date: Jan. 9, 2003

(65) Prior Publication Data

US 2004/0177808 A1 Sep. 16, 2004

(30) Foreign Application Priority Data

Jun. 27, 2001 (DE) .............................. 101 30 959

(51) Int. Cl.
*B05C 3/00* (2006.01)

(52) U.S. Cl. ...................................... 118/423; 118/419

(58) Field of Classification Search ................ 118/423, 118/419; 384/192, 905, 907.1, 913, 262, 384/219, 218
See application file for complete search history.

(56) References Cited

U.S. PATENT DOCUMENTS

| | | | | |
|---|---|---|---|---|
| 3,578,828 A | * | 5/1971 | Orkin et al. ................. | 384/129 |
| 3,711,171 A | * | 1/1973 | Orkin et al. ................. | 384/297 |
| 4,559,248 A | * | 12/1985 | Sumiyoshi et al. ............ | 442/5 |
| 5,538,559 A | * | 7/1996 | Kleimeyer et al. ......... | 118/423 |
| 5,571,328 A | | 11/1996 | Newland .................... | 118/423 |
| 5,667,310 A | | 9/1997 | Oyagi et al. ................ | 384/137 |
| 5,711,613 A | | 1/1998 | Ookouchi et al. .......... | 384/283 |
| 5,951,170 A | * | 9/1999 | Plangetis .................... | 384/219 |
| 6,562,412 B1 | * | 5/2003 | Fontaine ................... | 427/434.4 |

FOREIGN PATENT DOCUMENTS

WO    WO 91/03581    3/1991

* cited by examiner

*Primary Examiner*—Brenda A. Lamb
(74) *Attorney, Agent, or Firm*—Fay, Sharpe, Fagan, Minnich & McKee, LLP

(57) ABSTRACT

The coating device (10) for coating a metal band or strip (12, 12') in a melted metal mass (14) comprises a shaft (16, 18) rotatably supported in the melted metal mass (14) by a slide bearing ($26_1$, $26_2$) is formed by a bearing housing (32) and an open bearing shell (34) held therein, with two bearing surfaces (36). Between the two bearing surfaces (36), the bearing shell (34) comprises a deformation zone (40) with a deformation element (44). With high radial forces of the shaft occurring, the two bearing shell halves ($38_1$, $38_2$) are slightly spread. The flexible deformation zone ensures that the two bearing shell halves remain interconnected and resist breaking in this area.

8 Claims, 3 Drawing Sheets

COATING DEVICE

BACKGROUND OF THE INVENTION

The invention relates to a coating device for coating a metal band in a melted mass of a metal.

Coating devices are used for coating metal bands and sheets with zinc, aluminum, tin, lead, galvalum or galfan. In doing so, the metal band or sheet is drawn through a several hundred degrees Celsius hot melted metal mass of the coating metal: The metal band continuously dips downward into the melted metal mass, is deflected upward by a rotating shaft in the melted metal mass, steadied by a stabilizing shaft and travels upward out of the melted metal mass again. The bearing of the deflecting shaft and/or the stabilizing shaft in the melted mass is effected in open slide bearings that are designed as wearing bearings. Each of the slide bearings is formed by a bearing housing and a non-closed integral bearing shell held therein, with a single pair of bearing surfaces. With high radial loads of the deflecting and stabilizing shafts, respectively, the two bearing surfaces are spread by the shaft journal. In case of strong radial forces, bending forces may occur between the two rigidly interconnected bearing surfaces which are so high that the bearing shell breaks in this area. After the bearing shell has broken, it has to be exchanged. The exchange of the bearing shell takes up several hours, which represents a considerable damage with coating plants having a value of up to 200 million DM.

Therefore, it is the object of the invention to avoid a break of the bearing shell even with high radial loads.

SUMMARY OF THE INVENTION

In the coating device according to the invention, the bearing shell comprises a deformation zone with a deformation element between the two bearing surfaces. This means that the two neighboring bearing surfaces of the bearing shell are no longer rigidly and therefore break-susceptibly interconnected, but are connected to each other by a deformation element that is configured such that it permits distortions while maintaining the connection of the two bearing surfaces or bearing shell parts. Thereby, an undesired break of the bearing shell is avoided. The expensive exchange of broken bearing shells is eliminated.

Preferably, the deformation zone is formed by a continuous radial gap in the bearing shell, filled up by the deformation element that consists of a material different from that of the two bearing shell parts. The radial gap separates the bearing shell into two separate parts only connected with each other by the deformation element. The deformation element is configured in the form of a strip completely filling up the radial gap.

The deformation zone, however, can also be configured differently, for example as a rotational joint or in the form of a film hinge with a film-like thin connection bridge between the two bearing surfaces or bearing shell parts.

According to a preferred embodiment, the bearing shell is made of ceramics. Preferably, the deformation element is a graphite sheet arranged in the radial gap between the two bearing shell parts and interconnecting them. As tests have shown, the graphite sheet has a sufficient flexibility for movements between the two bearing shell parts occurring with high radial forces. At the same time, the graphite sheet is sufficiently resistant against the possibly very aggressive melted metal mass.

According to a preferred embodiment, the gap width is smaller than 2.0 mm, particularly between 0.3 mm and 1.0 mm. As tests have shown, a graphite sheet with a thickness of 0.5–0.8 mm in particular is well suitable as deformation element in a radial gap of the same width.

According to a preferred embodiment, the shaft is a stabilizing shaft for stabilizing the metal band against fluttering.

BRIEF DESCRIPTION OF THE DRAWING

The invention may take from in various components and arrangements of components, and in various steps and arrangements of steps. The drawings are only for purposes of illustrating a preferred embodiment and are not to be construed as limiting the invention.

Hereinafter, an embodiment of the invention is explained in detail with reference to the drawings.

In the Figures:

FIG. 1 shows a coating device according to the invention, with a deflecting shaft and a stabilizing shaft in a melted metal mass in side view, FIG. 2 shows the coating device of FIG. 1 in front view, FIG. 3 shows a longitudinal section of a slide bearing of the coating device of FIG. 1, and FIG. 4 shows a cross-section of a slide bearing of the coating device of FIG. 1.

DETAILED DESCRIPTION OF THE PREFERRED EMBODIMENTS

Figure 1:
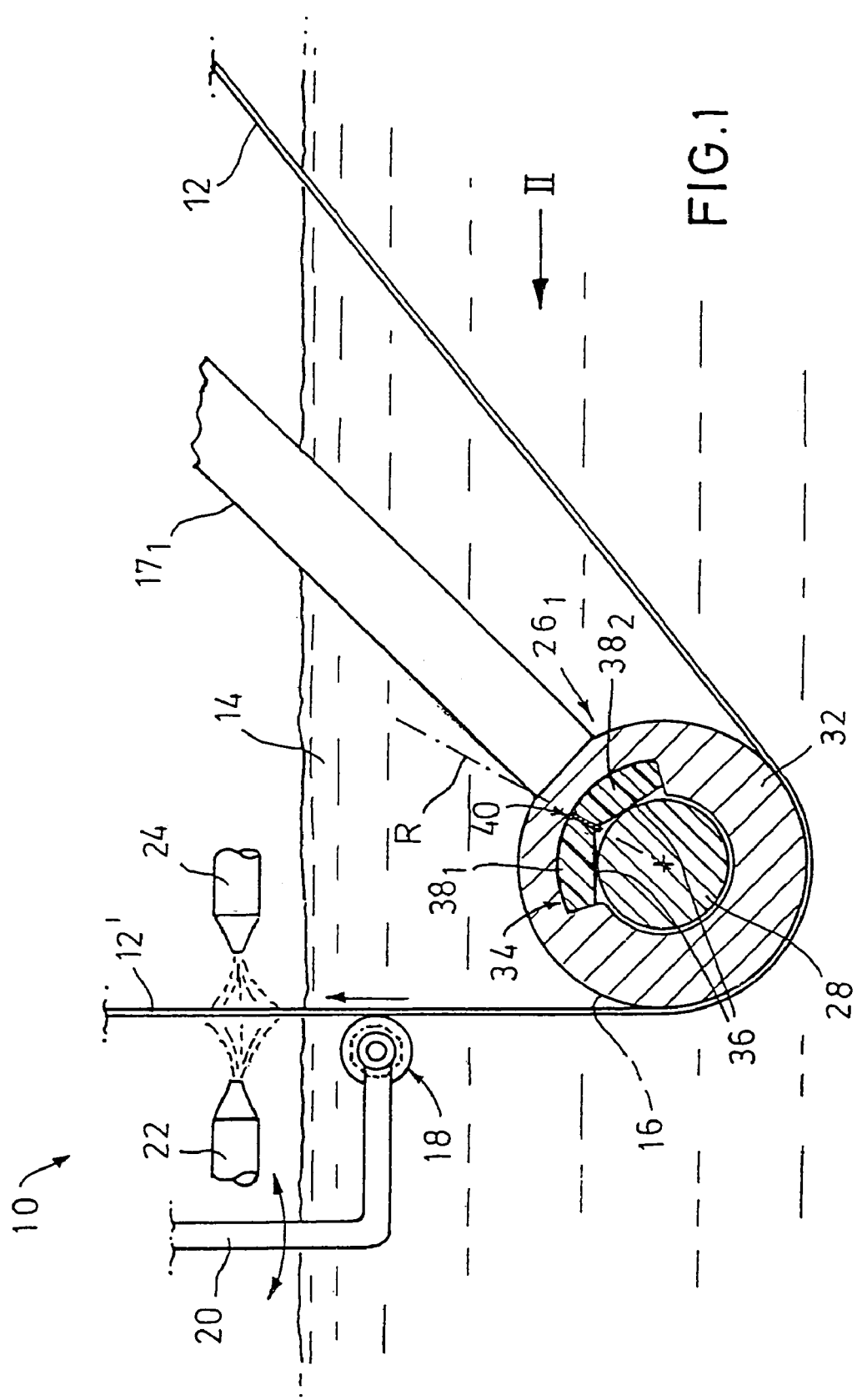
Figure 2:
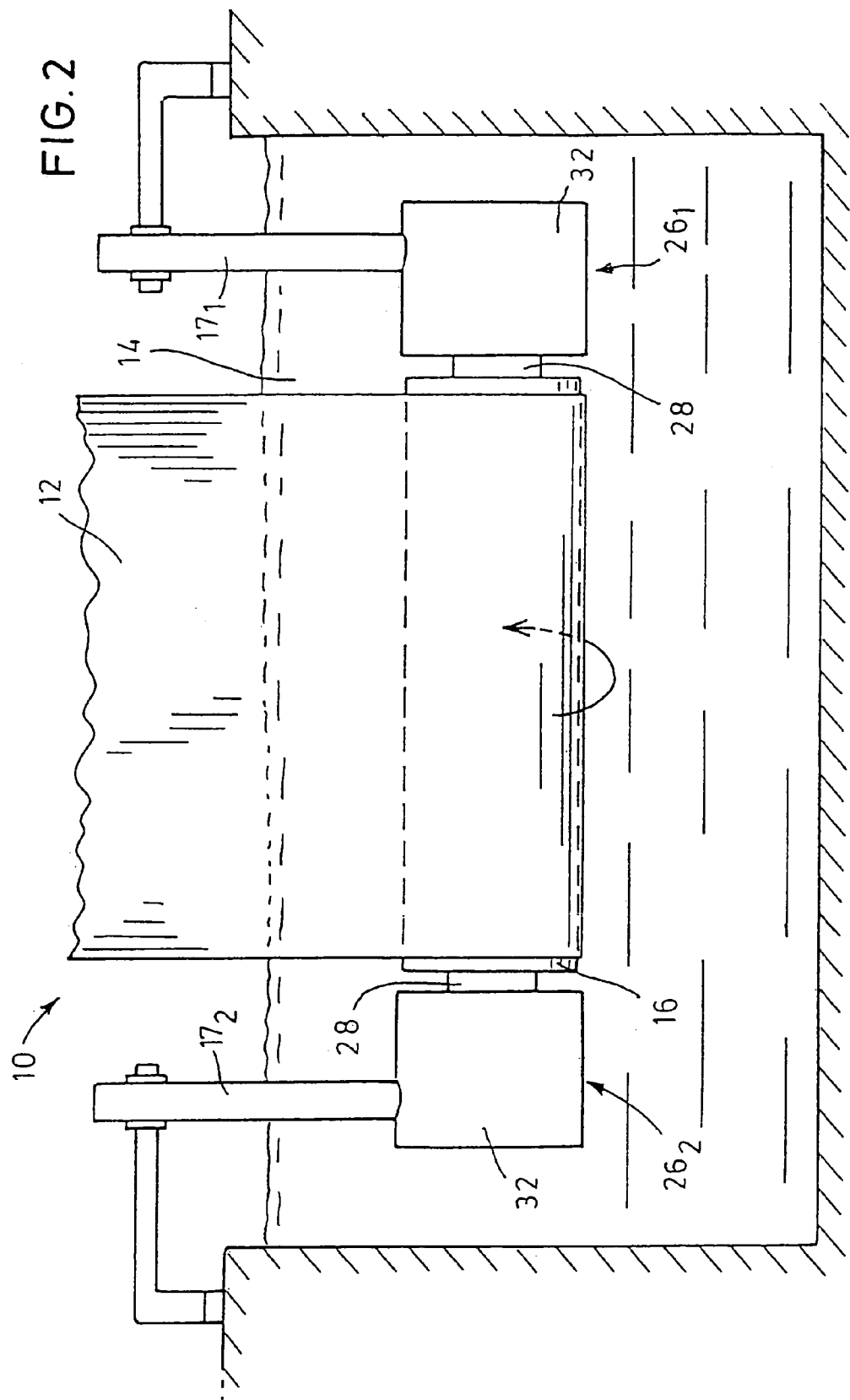

In FIG. 1, a coating device 10 is illustrated in side view in a simplified manner, with the deflecting shaft in partial cross-section. A metal band 12 is led through a melted metal mass 14 to provide the surface of the metal band 12 with a thin metal coating. The melted metal mass may consist of liquid zinc, lead, tin, aluminum, galvalum, galfan or other metals suitable for the coating of metal. Depending on the type of the melted metal, the melted metal mass 14 has a temperature of 400–1000° C.

The metal band 12 is introduced into the melted metal mass 14 at an angle of 30–45° to the horizontal and deflected upward in the melted mass 14 by means of a rotatable deflecting shaft 16 so that the metal band 12' is led vertically upward out of the melted metal mass 14 again. The angle of contact of the metal band 12,12' about the deflecting shaft 16 amounts to about 130°. The tensile force of the metal band 12 amounts to between 1.0–8.5 tons.

For stabilizing the metal band 12,12', a stabilizing shaft 18 abuts on the metal band 12' moving vertically out of the melted metal mass 14 in order to dampen and to reduce the horizontal fluttering of the metal band 12'. The stabilizing shaft 18 is suspended at a movable guide arm 20 that is pivotally supported and biased toward the metal band 12' in horizontal direction. Further, the guide arm 20 of the stabilizing shaft is dampened in its horizontal movement by a corresponding dampening element. Both the deflecting shaft 16 and the stabilizing shaft 18 are permanently dipped into the melted metal mass 14 during operation.

At both sides of the vertically extending metal band 12' emerging from the melted metal mass 14, gas nozzles 22,24 are arranged through which a gas flow is applied on both sides of the metal band 12'. Due to the gas flow, the liquid metal layer on the metal band 12' is reduced to a definite constant layer thickness.

By two pivot arms 17₁, 17₂, the deflecting shaft 16 is held in the melted metal mass 14. The deflecting shaft 16 is adapted to be lifted out of the melted metal mass 14 for the purposes of maintenance and repair. For this purpose, the guide arm 20 with the stabilizing shaft 18 is also adapted to be lifted out of the melted metal mass 14. The arms 17$_1$, 17$_2$, 20 are lifted out of the melted metal mass 14 by means of a non-illustrated change-over tie-bar to which they are mounted.

Figure 3:
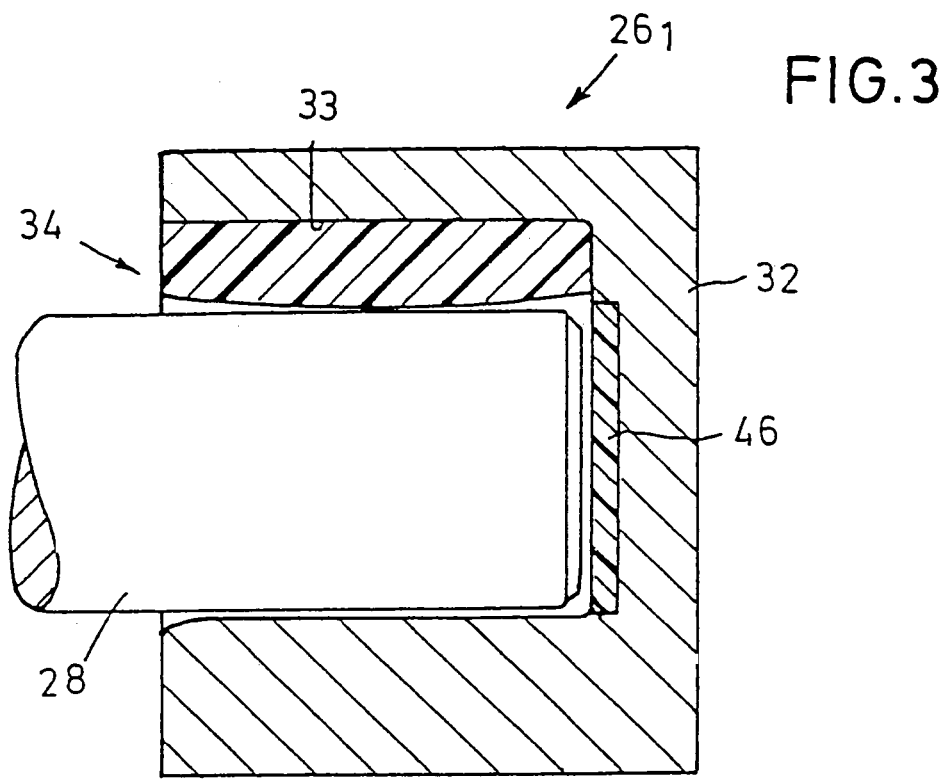
Figure 4:
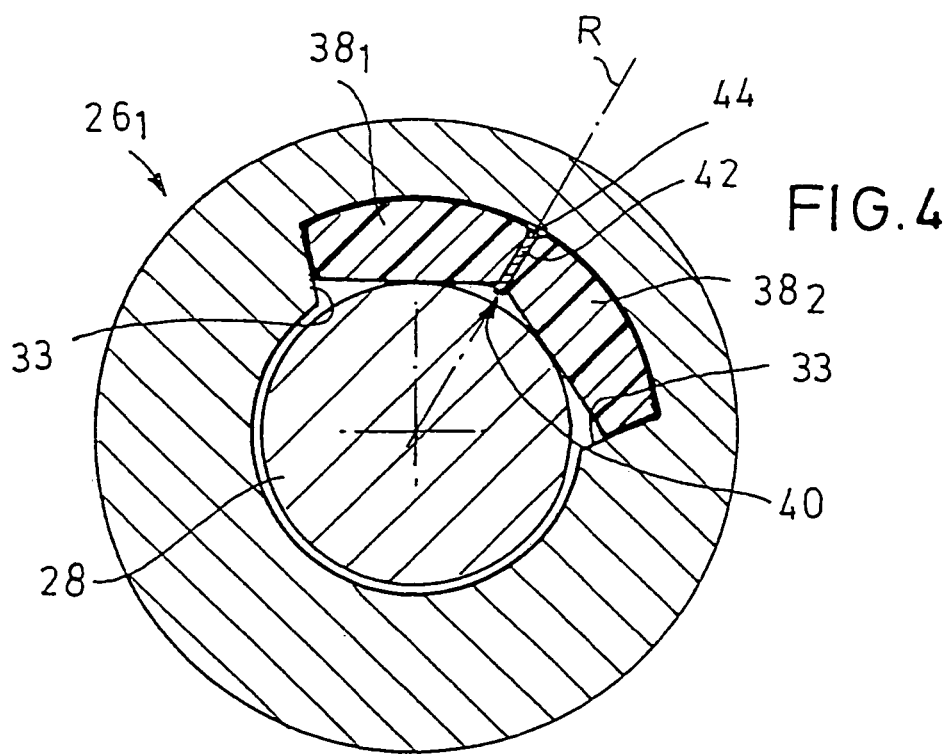

As can be seen in FIGS. 1–4, slide bearings 26$_1$, 26$_2$ are provided at each of the two dipped ends of the pivot arms 17$_1$, 17$_2$, in which the deflecting shaft 16 is rotatably supported. The two slide bearings 26$_1$, 26$_2$ are wearing bearings substantially formed by a bearing housing 32 and a non-closed bearing shell 34 axially inserted therein. Each bearing shell 34 forms two bearing surfaces 36 that are inclined to each other at an angle of about 130°. In longitudinal section, the bearing surfaces 136 are arched towards the bearing center in a slightly convex manner, as can be seen in FIG. 3, and in cross-section, they have a straight configuration, as can be seen in FIG. 4. In a non-worn-out bearing shell 34, the shaft journal 28 and the bearing surfaces 36 practically touch each other only on a punctual contact area.

The bearing shell 34 consists of two bearing shell halves 38$_1$, 38$_2$ between which a deformation zone 40 is provided. The deformation zone 40 is formed by a radially and axially continuous radial gap 42 comprising a graphite sheet as deformation element 44. The gap width of the radial gap 42 and thus the thickness of the graphite sheet amounts to about 0,5 mm.

The bearing shell 34 is inserted into a corresponding segment-like recess 33 of the bearing housing 32. The two bearing shell halves 38$_1$, 38$_2$ consist of zirconium oxide, but can also consist of another ceramic material, such as, for example, silicon nitride or silicon carbide.

In the region of the closed bottom of the bearing housing, an axial abutment plate 46 of ceramics is respectively let in.

As results particularly from FIG. 1, the force resultant R of the radial forces acting upon the two slide bearings 26$_1$, 26$_2$, resulting from the two tensioned metal band legs, acts approximately in the direction of the median line of the two legs of the metal band 12,12'. The two bearing surfaces 36 are arranged at both sides of the radial force resultant R at approximately the same angle, i.e., the radial force resultant R lies about centrally between the two bearing surfaces 36.

In case of strong tensile forces of the metal band 12,12', high radial forces are transferred from the deflecting shaft 16 or its shaft journals 28 onto the slide bearings 26$_1$, 26$_2$. Due to a certain elasticity, i.e. resilience, of the metal bearing housing 32, deformations are permitted in the region of the deformation zone 40. By the deformation zone 40 in the form of the flexible graphite sheet, a breakage and separation of the connection between the two bearing shell halves 38$_1$, 38$_2$ is reliably avoided. Thereby, a damaging or a breaking of the bearing shell 34 is excluded and the reliability and average service life of the bearing shells 34 are improved.

With its shaft journals, the stabilizing shaft 18 is also supported in slide bearings corresponding to those of the deflecting shaft 16.

By providing a deformation zone with a deformation element between the two bearing surfaces 36, the two bearing shell halves 38$_1$, 38$_2$ can be bent to each other when high radial forces occur, without a material breakage and hence a destruction of the bearing shell being able to occur in the zone between the two bearing shell halves 38$_1$, 38$_2$.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A coating device for coating a metal band in a melted metal mass, comprising:
    a shaft, rotatably supported in the melted metal mass by a slide bearing, for guiding the metal band,
    the slide bearing being formed by a bearing housing and an open bearing shell held therein, the bearing shell comprising:
        exactly two bearing surfaces,
        the two bearing surfaces having a straight configuration in cross section,
        the two bearing surfaces being inclined to each other at an angle of about 130°,
        a deformation element which allows distortions of the bearing surfaces relative to each other, the deformation element being mounted between the two bearing surfaces,
    the bearing housing defining:
        a segment-like recess into which the bearing shell is inserted.

2. The coating device according to claim 1 wherein the bearing shell is ceramic.

3. The coating device according to claim 1, wherein the shaft is a stabilizing shaft.

4. A coating device for coating a metal band in a melted metal mass, comprising:
    a shaft, rotatably supported in the melted metal mass by a slide bearing, for guiding the metal band,
    the slide bearing being formed by a bearing housing which defines a segment-like recess and an open beating shell received in the bearing housing segment-like recess, the bearing shell including:
        bearing surfaces, wherein the bearing surfaces consist of first and second bearing surfaces which are inclined to each other at an angle of about 130°, each bearing surface having a straight configuration in cross section and defining a line of contact with the shaft,
        a continuous radial gap formed in the bearing shell between the first and second bearing surfaces, and
        a deformation element is arranged in the gap between the first and second bearing surfaces.

5. The coating device according to claim 4, wherein the radial gap has a width smaller than 2.0 mm.

6. The coating device according to claim 5, wherein the gap width of the radial gap is between 0.3 mm and 1.0 mm.

7. An apparatus for coating a metal strip with a coating metal, the apparatus comprising:
    a pair of slide bearings, each defining a bore;
    a roller over which the metal strip passes disposed within a melted mass of the coating metal, the roller including journals at each end, each journal being rotatably received in a corresponding one of the slide bearing bores;
    first and second bearing elements disposed within each slide bearing bore in frictional engagement with one of the journals; and
    a resilient deformation element mounted between and in engagement with the first and second bearing elements of each slide bearing to provide a deformation zone between the bearing elements to protect the bearing elements against breakage.

8. A coating device for coating a metal band in a melted metal mass at a temperature of 400°C.–1000°C. comprising:
   a shaft for guiding the metal band, the shaft being rotatably supported in the melted metal mass by a slide bearing,
   the slide bearing including:
      a bearing housing.
      a plurality of bearing surfaces each having a cross-section in a straight configuration and being received in corresponding recesses of the bearing housing with the bearing surfaces being inclined to each other at an angle of about 130°, and
      a graphite sheet mounted between two adjacent bearing surfaces.

* * * * *